Patented Nov. 4, 1952

2,616,874

UNITED STATES PATENT OFFICE 2,616,874

METHYLOL DERIVATIVES OF UREIDO-POLYAMINES

Robert S. Yost, Oreland, and Robert W. Auten, Jenkintown, Pa., assignors to Rohm & Haas Company, Philadelphia, Pa., a corporation of Delaware No Drawing. Application July 19, 1951, Serial No. 237,664

12 Claims. (Cl. 260—70)

This invention relates to novel nitrogenous resinous compositions which are particularly useful for treating paper to impart thereto improved properties especially in relation to wet strength. This invention also concerns a process whereby these compositions are prepared.

The present application is a continuation-in-part of our application Serial No. 185,912, filed September 20, 1950, and now abandoned.

The process of this invention comprises a series of steps whereby defined polyethylenepolyamines, dihaloalkanes, a urea, and formaldehyde are combined in a succession of steps to give water-soluble reaction products. As the first of these steps, a polyethylenepolyamine having a molecular weight of at least 146 and preferably at least 189 is reacted in solution with a dihaloalkane of two to three carbon atoms to form a soluble reaction product. This product is condensed with urea by heating it therewith. The resulting condensate is then reacted in solution with formaldehyde within prescribed proportions to give a resinous composition which is particularly useful for improving the wet strength of paper.

Condensates of urea and formaldehyde are, of course, well known. They do not, however, have the properties of the resinous compositions of this invention. Insoluble resins have been formed by reacting polyimines or polyamines with an excess of a dihaloalkane and it has been further proposed to harden such resins with formaldehyde or with urea and formaldehyde. It is obvious that such insoluble resins have little relationship to the water-soluble resinous compositions provided by the present invention.

For the initial step of the process of this invention, there are reacted a dihaloalkane and a polyethylenepolyamine. The dihaloalkane contains two to three carbon atoms with chlorine or bromine as the preferred halogens. There may thus be used 1,2-dichloroethane, 1,2-dibromoethane, 1,2-dichloropropane, 1,2-dibromopropane, or mixed halogen compounds, the dihaloalkane in each instance having a chain of two carbon atoms between the halogens.

The polyamine should have a minimum molecular size corresponding to a weight of at least 146, although it is preferred that the polyamine have a minimum molecular weight of 189. There is no sharp upper limit to the size of the polyamines. Yet for practical purposes an upper limit for the molecular size of the starting material of about 550 on average includes most of the various species that are available. The polyamines are prepared usually as mixtures, although triethylenetetramine and tetraethylenepentamine are available in products each boiling over a range of about 30° C. and containing 85% to 95% of a single compound. Higher polyethlenepolyamines are obtained as a residue which it is difficult to fractionate. There is evidence that these preparations contain materials having tertiary amine groups as well as primary and secondary groups.

For the preparation of above polyethylenepolyamines one may take a more readily available amine, such as diethylenetriamine or ethylenediamine, and react such amine with one of the dihaloalkanes defined above or a mixture thereof to form a polyalkylenepolyamine hydrohalide, which is then reacted with a base such as sodium hydroxide or sodium carbonate to give free polyamine of the molecular size defined above. The product of this preliminary reaction is fully equivalent to the commercial materials already described.

This preliminary condensation is desirably performed with 0.25 to 0.75 moles of a dihaloalkane per mole of ethylenediamine, 1,2-propylenediamine, trimethylenediamine, diethylenetriamine, or mixtures thereof. The direct condensate is an amine hydrohalide, the hydrohalide of which is destroyed by reaction with an alkaline reagent. The resulting polyalkylenepolyamine is then ready for reaction with a dihaloalkane, just as the triethylenetetramine or other higher polyethylenepolyamine shown above.

A dihaloalkane and polyethylenepolyamine, both meeting the above limitations, are reacted, preferably in solution in an inert solvent, between 70° and 150° C., and if necessary, under pressure. Water or a short chained saturated monohydric alcohol or mixture of these liquids is particularly useful as solvent. About 20% to 60% of the reaction mixture is solvent. The presence of solvent has been found particularly desirable to moderate the reaction and help prevent development of insoluble reaction products. Production of soluble products also depends upon the ratio of dihaloalkane to polyethylenepolyamine. This ratio should be at least 0.7:1. It may be as high as 1.6:1 when the polyamine is triethylenetetramine. The practical upper ratio decreases as the number of amine groups increases. Thus, with tetraethylenepentamine the upper ratio should be not over 1.3:1 and not over 1.1:1 in the case of pentaethylenehexamine. For higher polyamines the ratio should not exceed 1:1. In any case the proportional amounts of dihaloalkane and polyamine fall within the ratios of 0.7:1 and 1.6:1 and are such that they yield a soluble condensate when reacted in solution. The above ratios are by moles.

The condensation of polyalkylene polyamine and dihaloalkane may be carried out in one step or in a series of steps. If a series of steps is used, the hydrohalide may be neutralized at each step, if so desired. In a stepwise procedure the total amount of dihaloalkane may in some cases be somewhat above the 1.6:1 ratio and yet soluble condensates are still produced.

Under these conditions, the products which result reach a molecular range at which the viscosities of their aqueous solutions containing 60% to 65% solids come within the range at 25° C. of N to $Z_3$ on the Gardner-Holdt scale and preferably U to $Z_1$. The reaction is then interrupted. Sufficient alkali may be added here to convert the polyamine hydrohalide to the free polyamine. A small excess of alkali does not interfere with subsequent reactions. The resulting salt may be left in the reaction mixture, although it can be removed, if desired. In the preferred process solvent is stripped off at this point to yield the material to be subjected to the step next to be described—reaction with urea. It is not, however, essential to strip off solvent at this point, except to ensure that a temperature at least sufficient to start evolution of ammonia can be reached. This temperature is usually near 110° C. If the temperature is carried above this point, solvent is taken off rapidly and the rate of reaction will increase.

If the hydrohalide is not destroyed by addition of alkali, as shown above, the amine hydrohalide may nevertheless be used in the subsequent step of reacting with urea. Under these conditions the final product may not be quite so effective for improving the wet strength of paper as the product which results after the hydrohalide is destroyed. Yet the final product made with a polyamine hydrohalide as an intermediate is a very useful one.

In the next step the product from reaction of dihaloalkane and polyethylenepolyamine is reacted with urea. The amount of the urea needed depends upon the —NH— groups available for reaction in the above product. The ratio of urea to —NH— groups may vary from 0.2:1 to 1.5:1. The preferred ratios are from 0.5:1 to 1.2:1. The product and urea are mixed and heated. Reaction between them begins in the range of about 100° to 110° C. with evolution of ammonia. The rate of reaction increases as the temperature increases until at about 160° C. evolution of ammonia is complete in 15 to 20 minutes. Temperatures may be carried to 200° C., a range of 100° to 200° C. being suitable. When water is not present the preferred temperature range is 120° to 150° C. and the reaction is continued until a 50% aqueous solution of the solids has a viscosity of about B to M at 25° C. on the Gardner-Holdt scale. It is preferred that the reaction be interrupted when the viscosity of the 50% solution is C to H. If the reaction between the reaction product of dihaloalkane with polyethylene-polyamine and urea is performed in an aqueous system, the temperature of the reacting mixture under reflux at atmospheric pressure is about 112° C. In this case the reaction is continued until the same viscosities are reached. In any case, the reaction is stopped before gelation has started so that the reaction product with urea remains fully soluble. The product is cooled and dissolved in water to give a 20% to 70% solution for use in the next operation.

In this operation the reaction product formed with urea is reacted in aqueous solution with formaldehyde. The reaction is carried out at 20° to 100° C. About 0.6 to 1.5 moles of formaldehyde, HCHO, is used per hydrogen on nitrogen atom in the above reaction product, including the hydrogen on free urea present therein. The upper limit is not sharp. No deleterious effects result from use of excess formaldehyde. On the other hand enough formaldehyde must be taken to yield a stable product. With ratios less than 0.5 to 1 the resulting resinous product has been observed to gel in a day or two.

The hydrogen atoms available for reaction can be calculated by considering the original nitrogen content of the dihaloalkane-polyamine reaction product and the extent of reaction of urea therewith. Each nitrogen of this product is arbitrarily regarded as providing an —NH— group. Each unreacted —NH— provides one hydrogen; each reacted mole of urea provides two hydrogens; and each unreacted mole of urea provides four hydrogens. The extent of reaction of polyamine and urea can be gauged by the amount of ammonia evolved in the reaction with urea.

A sample calculation will illustrate the application of these considerations. A dihaloalkane-polyethylenepolyamine condensate and urea are mixed in the proportions of 12 equivalents of the former (based on —NH— groups) and 12 moles of urea, this being a 1:1 ratio of urea to —NH—. This mixture is heated with evolution of five moles of ammonia. There are, therefore, reacted five moles of urea, providing ten hydrogen equivalents. Seven equivalents of —NH— groups remain unreacted, the difference between equivalents taken and ammonia evolved. By the same token seven moles of urea remain in the fusion mixture, each mole supplying four equivalents of hydrogen. There are then 45 equivalents of hydrogen, for which formaldehyde should be supplied. If the formaldehyde condensate ratio is to be 0.9 to 1, 40.5 equivalents of formaldehyde will be mixed with this polyamine-urea condensate.

The formaldehyde is usually used in a 30% to 37% aqueous solution, but even more concentrated solutions may be used such as those supplying 40% to 50% available formaldehyde. It may, if desired, be also supplied at least in part from a revertible polymer. The solution of product from the reaction of polyamine and urea is mixed with formaldehyde. The resulting reaction mixture may be heated at 40°–100° C. to complete the reaction. A resinous condensate in solution results. It may be used directly in this form or it may be concentrated, as by evaporation under reduced pressure or it may be dried, as by spray drying. It may be mixed with a soluble urea-formaldehyde condensate or melamine-formaldehyde condensate.

Typical preparations of the soluble resinous products of this invention are given in detail in the following examples. Parts are by weight.

*Example 1*

There was dissolved 94.5 parts by weight of a tetraethylenepentamine of 88% purity in 80 parts of water. Thereto was added 49.5 parts of ethylene dichloride. The mixture was stirred and heated under reflux for four hours. The pot temperature at this time was 111° C. This reaction mixture had a viscosity of W on the Gardner-Holdt scale at 60% solids. It was diluted with 150 parts of water and treated with 40 parts of solid sodium hydroxide.

The resulting solution containing the above reaction product and sodium chloride was placed in a reaction vessel in the amount of 194.5 parts. This was equivalent to the use of 50 parts of the above reaction product. The reaction vessel was warmed and the water was distilled off under low pressure. To the residue was added 72 parts of urea and the vessel was heated on an oil bath. Ammonia was evolved, absorbed in water, and determined by titration. The temperature at which ammonia evolution began was 114° C. The temperature was gradually raised to 135° C. and held at this level for an hour. There was added 200 parts of hot water to give a solution containing solids of 36.5%. The amount of ammonia absorbed was 10 parts.

A 62.4 part portion was taken. This by calculation contained 0.75 equivalent of hydrogen. To this was added 62.4 parts (0.75 mole) of a 36% aqueous formaldehyde solution. The mixture was heated to 95° C. for 30 minutes, yielding 127.5 parts of a solution of resinous condensate containing 28.4% of total solids or 25.3% of resinous solids. The pH of this solution was 7.4.

The solution was found highly effective for improving the wet strength of paper.

Example 2

There was charged to a reaction vessel 1069 parts by weight of ethylene dichloride and 1440 parts of water. The mixture was stirred and thereto was added 1701 parts of tetraethylenepentamine. The heat of solution caused the temperature of the mixture to rise 30° C. The mixture was heated until reflux began, whereupon the heat of reaction maintained the temperature of the reaction mixture at refluxing temperatures for about an hour. The reaction mixture was then heated and stirred until the viscosity of the mixture was X on the Gardner-Holdt scale.

A portion of 318 parts of the reaction mixture was treated with 128 parts of a 50.9% sodium hydroxide solution and 216 parts of urea was then added. This mixture was stirred and heated with water being distilled off under reduced pressure. The temperature was carried to 110° C. under low pressure. Normal pressure was restored and the batch heated at 130°–135° C. for 1.5 hours. The viscosity of a 50% aqueous solution of the resulting product was D on the Gardner-Holdt scale. At this point 195 parts of water was added and the mixture stirred until homogeneous. The resulting mixture was cooled to 30° C. whereupon 1220 parts of an aqueous 37.6% formaldehyde solution was added and stirred into the amine-urea condensate. The viscosity of the resulting solution was B on the Gardner-Holdt scale.

This condensate was applied to paper pulp at the wet end of the paper making machine. It was found to impart excellent wet strength to papers from bleached or unbleached sulfite or kraft pulps. It is effective in amounts of 0.25% to 5% on the weight of the dry fiber. It gives high early wet strengths and wet strengths increase for some days after the paper has been made. It gives higher strengths at low concentrations, such as ¼% to 1%, than the resins which have heretofore been proposed for this purpose. It gives higher strengths at concentrations such as 2% on the weight of fiber when the treated papers stand for two to four weeks than any resin which has previously been commercially used. Although high wet strengths are developed in paper by use of the resin, it is nevertheless possible to recover "broke" and to do so more readily than in the case of paper treated with melamine-formaldehyde condensates.

Example 3

There were mixed 147 parts by weight of propylene dichloride, 189 parts of tetraethylenepentamine, and 160 parts of water. This mixture was stirred and heated at 120°–130° C. for nine hours in a stainless steel autoclave. During this time the pressure increased from 30 p. s. i. to 160 p. s. i., apparently due to formation of a volatile by-product. The solution of the resulting product was cooled and treated with 220 parts of a 50% caustic soda solution.

There were mixed 155 parts of the above solution and 72 parts of urea. This mixture was heated with stirring under reduced pressure to a temperature of 110° C. after which the residue was heated at 118° to 155° C. until 9.7 parts of ammonia had been given off. The time of heating was one hour and ten minutes. There were then added 100 parts of water and 355 parts of 36% formaldehyde solution. This mixture was stirred with gentle heating for a half hour. The viscosity of the resulting solution was A on the Gardner-Holdt scale. It contained 34.2% resin solids and the pH of the solution was 7.9. This product was effective for improving the wet strength of paper.

Example 4

The procedure of Example 3 was followed except that after addition of the 50% sodium hydroxide solution to react with amine hydrochloride the solution was heated under low pressure. Water was thereby distilled off to yield a mixture of salt and polyamino product. This mixture was refluxed with isopropyl alcohol, whereby the polyamino product was dissolved. The alcoholic solution was filtered to separate the salt. The filtrate was subjected to distillation to remove the alcohol.

There was then mixed 50 parts of the resulting residue and 72 parts of urea in 200 parts of water. This reaction mixture was heated to 130° C. for a half hour. The resulting product when made into a 50% aqueous solution imparted thereto a viscosity of F on the Gardner-Holdt scale. This solution was reacted with 64.5 parts of a 36% formaldehyde solution and the resulting mixture warmed until the resulting solution had a viscosity of A on the Gardner-Holdt scale. The product had essentially the same properties as those described above.

Example 5

In this example there is illustrated the building up of an amine of considerable size in a series of steps. In the first step diethylenetriamine, which itself does not directly give a polyethylenepolyamine of the size required to yield a final product of full effectiveness in wet strength applications, is used to yield a starting polyamine of the size and type which will yield the preferred high molecular polyamines.

To 18.7 parts of diethylenetriamine which had been heated to 105° C. there was slowly added with good agitation 12.6 parts of ethylene dichloride. During this addition the temperature of the reaction mixture was kept at 105°–110° C., cooling being required at first and toward the end of the addition heating being necessary to maintain the desired temperature. When the addition of the above ethylene dichloride was complete, the reaction mixture was heated to 120° C. and held at this temperature until the viscosity of a sample thereof diluted with water in a ratio of 2:1 was between D and E at 25° C. on the Gardner-Holdt scale. The mixture was cooled and treated with 20.4 parts of aqueous 50% sodium hydroxide solution.

The reaction mixture was then heated to 105° C. and 10.8 parts of ethylene dichloride was slowly added with good agitation and with maintenance of temperature between 105°–110° C. The mixture was heated at 112° C. until the reaction mixture from which salt was allowed to settle had a viscosity of W to W+ on the Gardner-Holdt scale. The mixture was cooled to 100° C. and treated with 17.5 parts of aqueous 50% sodium hydroxide solution.

The reaction mixture was again heated to 105°–110° C. and 8.6 parts of ethylene dichloride were gradually added over a 2.5 hour period. The mixture was heated at 112° C. under reflux of water until the viscosity of the reaction mixture from which salt was centrifuged was about X on the Gardner-Holdt scale. The mixture was cooled and treated with 13.9 parts of aqueous 50% sodium hydroxide solution.

In the first step above the molar ratio of diethylenetriamine to ethylene dichloride was 1:0.69. In the second and third steps combined the ratio was 1:1.48. If this ratio is increased to 1:1.6, there results a gel which is still water-soluble, but which is not readily handled in the subsequent operations. Use of still more ethylene dichloride in the above steps leads to a gel which gives entirely unsatisfactory final products.

The polyamine of large molecular size as prepared above was heated under reduced pressure until about half of the water content of the polyamine preparation had been distilled off. The concentrate was then treated with 37.5 parts of urea and heated under reduced pressure until the temperature thereof reached 100° C. at 20 mm. pressure. Heating was continued under normal pressure. Evolution of ammonia began at about 105° C. The temperature of the mixture was raised to 135° C. and held at this level until a sample of the reaction mixture diluted with an equal weight of water gave a viscosity of C on the Gardner-Holdt scale.

This reaction product was diluted with 18.2 parts of water with the temperature kept at about 100° C. and then was cooled to about 50° C. It was treated with 222 parts of aqueous 37% formaldehyde solution. There was thus prepared a resin solution containing 42.1% of total solids. The resin solids mounted to 30%. The viscosity of the solution was B on the Gardner-Holdt scale.

This product gives a very good wet strength to papers from different types of cellulose fibers. It is distinctly superior in this respect to condensates made from mixtures of urea, formaldehyde, and polyethylenepolyamines. The above product and those made in previous examples are all characterized by imparting both high early wet strength and high final wet strength.

*Example 6*

In this example there is shown the conversion of ethylenediamine to a polyethylenepolyamine which is then carried to a large molecular size by further stepwise reaction with ethylene dichloride. The final product resulting after reaction with urea and then reaction with formaldehyde is a satisfactory and useful one for imparting high wet strength to paper.

To 194 parts of ethylendiamine of 93% purity at a temperature of 100° C. there was slowly added 148.5 parts of ethylene dichloride. The temperature during this addition was held between 100° and 110° C. The reaction mixture was then heated to 120° C. and held at this temperature until there was no more refluxing. The mixture was cooled to 90° C. and treated with 240 parts of aqueous 50% sodium hydroxide solution. The product at this point is on average triethylenetetramine.

It was heated to about 100° C. and treated with 118.8 parts of ethylene dichloride while the temperature was maintained between 100° and 110° C. The mixture was heated for an hour at 110° to 112° C. and cooled to 90° C. The polyamine hydrochloride formed in this reaction was treated with 192 parts of aqueous 50% sodium hydroxide solution.

The mixture was again heated to 100°–110° C. and while maintained in this temperature range was slowly reacted with 90.1 parts of ethylene dichloride. The reaction mixture was heated until water was refluxed, cooled to 90° C., and treated with 144 parts of aqueous 50% sodium hydroxide solution.

Again the reaction mixture was heated to 100°–110° C. and now treated with 29.7 parts of ethylene dichloride. The reaction mixture was heated until water was refluxed with the temperature of the mixture at 112° C. The mixture was cooled below 90° C. and treated with 48 parts of aqueous 50% sodium hydroxide solution.

A batch of 590 parts of the above mixture after treatment with sodium hydroxide solution was heated under reduced pressure with removal of about half of the water content. At this point 196 parts of urea were added and heating was continued with removal of the remaining portion of the water content. When the temperature reached 102° C. at 30 mm. pressure, heating was continued at atmospheric pressure. Evolution of ammonia began at 110° C. The batch was heated up to 150° C. and held at this temperature for an hour. Water was then added and the mixture was stirred for 15 minutes. With the temperature of the batch then reduced to 50° C. addition was made of 1580 parts of aqueous 37% formaldehyde solution. The mixture was thoroughly stirred to yield 2179 parts of resin solution containing 34.2% of total solids. The sodium chloride content was 8.2% and the resin solids amounted to 26%. This solution had a viscosity of A on the Gardner-Holdt scale. It was highly effective for imparting wet strength to paper by addition to paper pulp in the beater.

*Example 7*

There were mixed 1945 parts of triethylenetetramine and 264 parts of water and the mixture was stirred and heated to 100° C. Thereto was slowly added ethylene dichloride with the temperature between 100° and 110° C. until 1322 parts had been used. Cooling was necessary during the first part of this addition to control the temperature and toward the end of the addition heating was necessary to maintain the desired temperature level. The reaction mixture was heated at 120° C. until the viscosity of a sample diluted with water in an amount of one third of the weight of the sample was in the range Q to R at 25° C. on the Gardner-Holdt scale.

The reaction mixture was thereupon cooled to about 100° C. and treated with 2120 parts of acqueous 50% sodium hydroxide solution. The mixture was cooled to 70° C. and 750 parts were added of ethylene dichloride. The mixture was heated to refluxing temperatures with the temperature thereof rising over a period of two hours to 112° C., at which temperature the reflux was water. The mixture was heated until the viscosity of a 10 gram sample diluted with 7.5 grams of water was about C on the Gardner-Holdt scale. The reaction mixture was thereupon diluted with 1110 parts of water, cooled to 70° C. and treated with 1210 parts of aqueous 50% sodium hydroxide solution.

To this solution was added urea to an amount of 3490 parts. The resulting mixture was heated under reflux, the temperature being about 112° C. Under these conditions ammonia was evolved. Heating was continued until the viscosity of a sample, from which sodium chloride crystals were removed by centrifuging, was W on the Gardner-Holdt scale. Water was then distilled from the reaction mixture until 920 parts had been removed.

To this concentrate there were added 2140 parts of aqueous 37% formaldehyde solution. There was thus formed a resin solution amounting to 3200 parts, containing 38.4% of total solids and 31.2% of resin solids, and having a viscosity of A. This solution was highly effective for imparting wet strength to paper.

We claim:

1. A process of preparing resinous condensates which comprises reacting by heating together at 70° to 150° C. a dihaloalkane of not over three carbon atoms having a chain of two carbon atoms between the halogen atoms, said halogen being a member of the class consisting of chlorine and bromine, and a polyethylenepolyamine of a molecular weight of at least 146, the mole ratio of dihaloalkane to polyethylenepolyamine being at least 0.7:1 and not exceeding about 1.6:1 and being capable of yielding soluble condensation products, continuing reacting same until a 60% to 65% aqueous solution of the condensation products has a Gardner-Holdt viscosity of N to $Z_3$ at 25° C., reacting said products by heating with urea between 100° and 200° C. until a 50% aqueous solution of the resulting reaction products has a Gardner-Holdt viscosity of about B to M at 25° C., the ratio of urea to —NH— groups of said nitrogenous condensation products being between 0.2:1 and 1.5:1, reacting said resulting reaction products in aqueous solution with formaldehyde to form soluble resinous condensates, there being used at least 0.6 mole of formaldehyde for each hydrogen present on nitrogen in said nitrogeneous condensation products.

2. A process according to claim 1 wherein the dihaloalkane is a dichloroalkane.

3. A process according to claim 2 wherein the dichloroalkane is 1,2-dichloroethane.

4. The product obtained by the process of claim 1.

5. The product obtained by the process of claim 2.

6. The product obtained by the process of claim 3.

7. A process of preparing resinous condensates which comprises reacting by heating together at 70° to 150° C. in the presence of water a dihaloalkane of not over three carbon atoms, the halogen thereof being a member of the class consisting of chlorine and bromine, and a polyethylenepolyamine having a molecular weight of at least 189, the mole ratio of dihaloalkane to polyethylenepolyamine being at least 0.7:1 and not exceeding 1.3:1 and yielding soluble polyamine hydrohalide condensation products, continuing reacting same until a 60% to 65% aqueous solution of the said condensation products has a Gardner-Holdt viscosity of U to $Z_1$ at 25° C., adding a strong base in an amount to convert said polyamine hydrohalide condensation products to free polyamine condensation products, reacting them by heating them with urea between 120° and 150° C. until a 50% aqueous solution of the resulting reaction products has a Gardner-Holdt viscosity of about C to H at 25° C., the ratio of urea to —NH— groups of said condensation products being between 0.5:1 and 1.2:1, reacting in aqueous solution the said resulting reaction products with formaldehyde, there being used between 0.6 and 1.5 moles of formaldehyde for each hydrogen present on nitrogen in said reaction products, whereby soluble resinous condensates are formed.

8. A process according to claim 7 wherein the dihaloalkane is a dichloro compound.

9. A process according to claim 8 wherein the dichloroalkane is 1,2-dichloroethane.

10. The product obtained by the process of claim 7.

11. The product obtained by the process of claim 8.

12. The product obtained by the process of claim 9.

ROBERT S. YOST.
ROBERT W. AUTEN.

REFERENCES CITED

The following references are of record in the file of this patent:

UNITED STATES PATENTS

| Number | Name | Date |
|---|---|---|
| 2,554,475 | Suen | May 22, 1951 |

FOREIGN PATENTS

| Number | Country | Date |
|---|---|---|
| 474,601 | Great Britain | Nov. 1, 1937 |